US012640127B2

(12) United States Patent
Li et al.

(10) Patent No.: US 12,640,127 B2
(45) Date of Patent: May 26, 2026

(54) INTERACTIVE MOVEMENT AUDIO ENGINE

(71) Applicant: Lemon Inc., Grand Cayman (KY)

(72) Inventors: Bochen Li, Los Angeles, CA (US);
Daiyu Zhang, Los Angeles, CA (US);
Shawn Chan Zhen Yi, Los Angeles,
CA (US); Jitong Chen, Los Angeles,
CA (US)

(73) Assignee: LEMON INC., Grand Cayman (KY)

( * ) Notice: Subject to any disclaimer, the term of this
patent is extended or adjusted under 35
U.S.C. 154(b) by 1005 days.

(21) Appl. No.: 17/556,178

(22) Filed: Dec. 20, 2021

(65) Prior Publication Data

US 2023/0197040 A1 Jun. 22, 2023

(51) Int. Cl.
*G10H 1/00* (2006.01)
*G06V 40/16* (2022.01)
*G06V 40/20* (2022.01)

(52) U.S. Cl.
CPC ......... *G10H 1/0008* (2013.01); *G06V 40/174*
(2022.01); *G06V 40/20* (2022.01); *G10H
2210/105* (2013.01); *G10H 2210/325*
(2013.01); *G10H 2210/571* (2013.01); *G10H
2220/106* (2013.01); *G10H 2220/201*
(2013.01); *G10H 2220/455* (2013.01); *G10H
2250/311* (2013.01)

(58) Field of Classification Search
CPC ........... G10H 1/0008; G10H 2210/105; G10H 2210/325; G10H 2210/571; G10H
2220/106; G10H 2220/201; G10H
2220/455; G10H 2250/311; G06V 40/174;
G06V 40/20
See application file for complete search history.

(56) References Cited

U.S. PATENT DOCUMENTS

| | | | |
|---|---|---|---|
| 11,551,652 B1 * | 1/2023 | Pajjuri | G06N 3/088 |
| 2019/0147229 A1 | 5/2019 | Zatepyakin et al. | |
| 2019/0295323 A1 * | 9/2019 | Gutierrez | G02B 27/017 |
| 2022/0164204 A1 * | 5/2022 | Kwatra | G06N 5/022 |
| 2022/0335974 A1 * | 10/2022 | Butera | G06V 20/41 |
| 2022/0375362 A1 * | 11/2022 | Canberk | G06V 20/20 |

FOREIGN PATENT DOCUMENTS

| | | |
|---|---|---|
| CN | 109413351 A | 1/2019 |
| JP | 2002-311951 A | 10/2002 |

OTHER PUBLICATIONS

International Search Report mailed Jul. 7, 2023 in International
Application No. PCT/SG2022/050853.
(Continued)

*Primary Examiner* — Jianchun Qin
(74) *Attorney, Agent, or Firm* — Faegre Drinker Biddle &
Reath LLP

(57) ABSTRACT

A method for generating an audio output is described. Image
inputs of interactive movements by a user captured by an
image sensor are received. The interactive movements are
mapped to a sequence of audio element identifiers. The
sequence of audio element identifiers are processed to
generate a musical sequence by performing music theory
rule enforcement on the sequence of audio element identi-
fiers. An audio output that represents the musical sequence
is generated.

20 Claims, 8 Drawing Sheets

(56)            References Cited

OTHER PUBLICATIONS

Prasad J. S. et al., Gesture Based Music Generation. Second International Conference on Emerging Trends in Engineering and Technology, ICETET-09, Jan. 30, 2010, pp. 209-214 [Retrieved on Jun. 30, 2023] <DOI: 10.1109/ICETET.2009.110> II. Related Work, III. Methodology, IV. Implementation, VI. Conclusion.

IP H. H. S. et al., Cyber Composer: Hand Gesture-Driven Intelligent Music Composition and Generation. Proceedings of the 11th International Multimedia Modelling Conference (MMM'05), Feb. 14, 2005, pp. 1-7 [Retrieved on Jun. 30, 2023] <DOI: 10.1109/MMMC.2005.32> 2. Innovative approach to automated music generation, 3. System architecture.

Beyer et al., "Music Interfaces for Novice Users: Composing Music on a Public Display with Hand Gestures", Proceedings of the International Conference on New Interfaces for Musical Expression, Jun. 1, 2011, pp. 1-4.

Bresson et al., "From Motion to Musical Gesture: Experiments with Machine Learning in Computer-Aided Composition", CNRS, 2018, pp. 1-5.

European Search Report for EP Patent Application No. 229121124, Issued on Feb. 7, 2025, 11 pages.

Office action received from Japanese patent application No. 2024-537405 mailed on Apr. 15, 2025, 5 pages.

\* cited by examiner

410
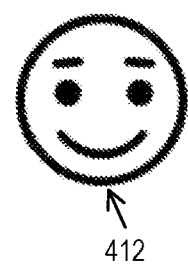
412
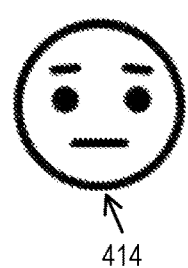
414
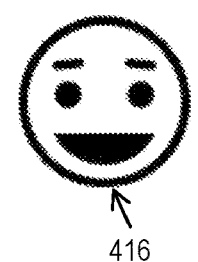
416
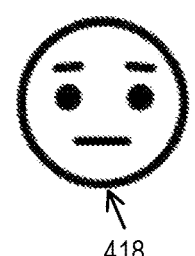
418
400
Fig. 4A
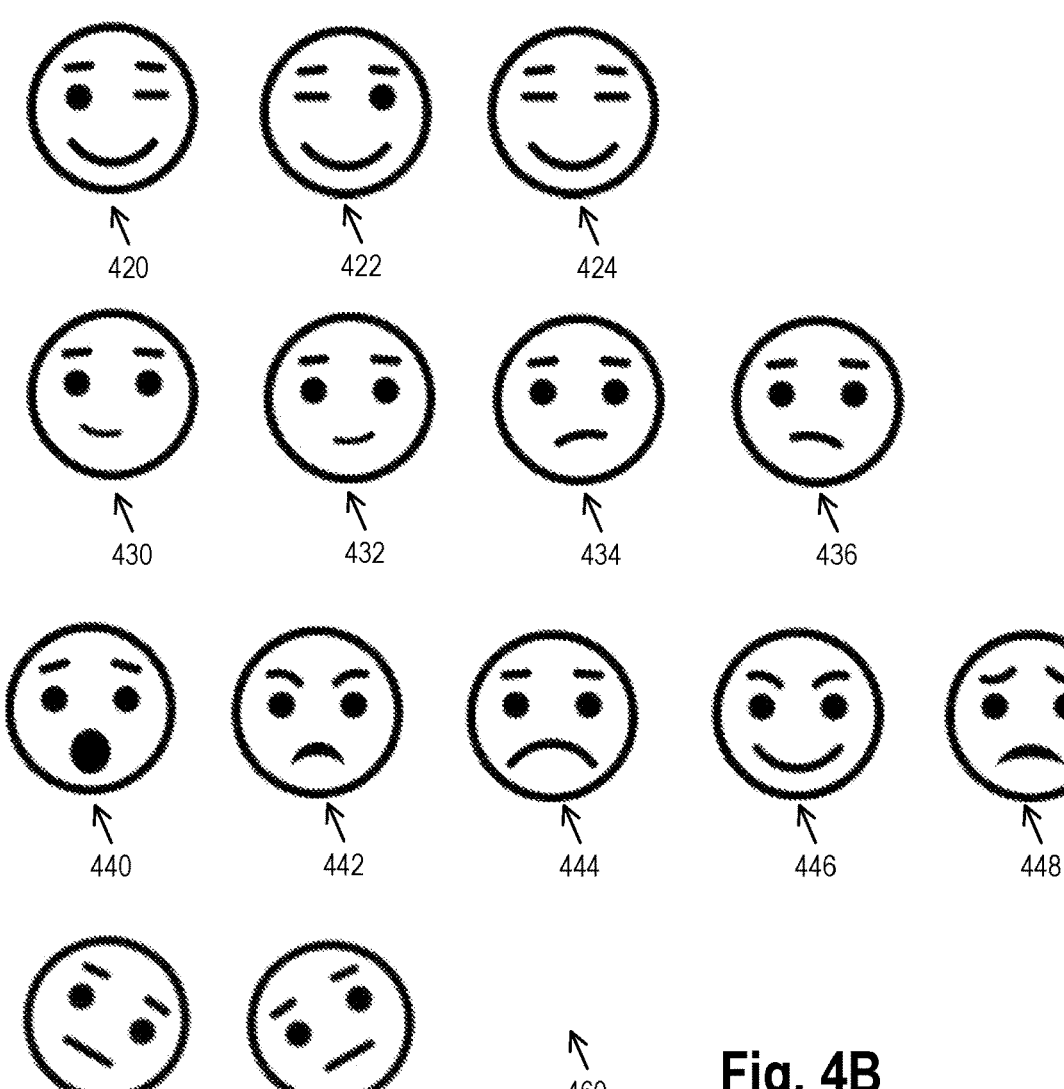
420     422     424
430     432     434     436
440     442     444     446     448
450     452     460
Fig. 4B

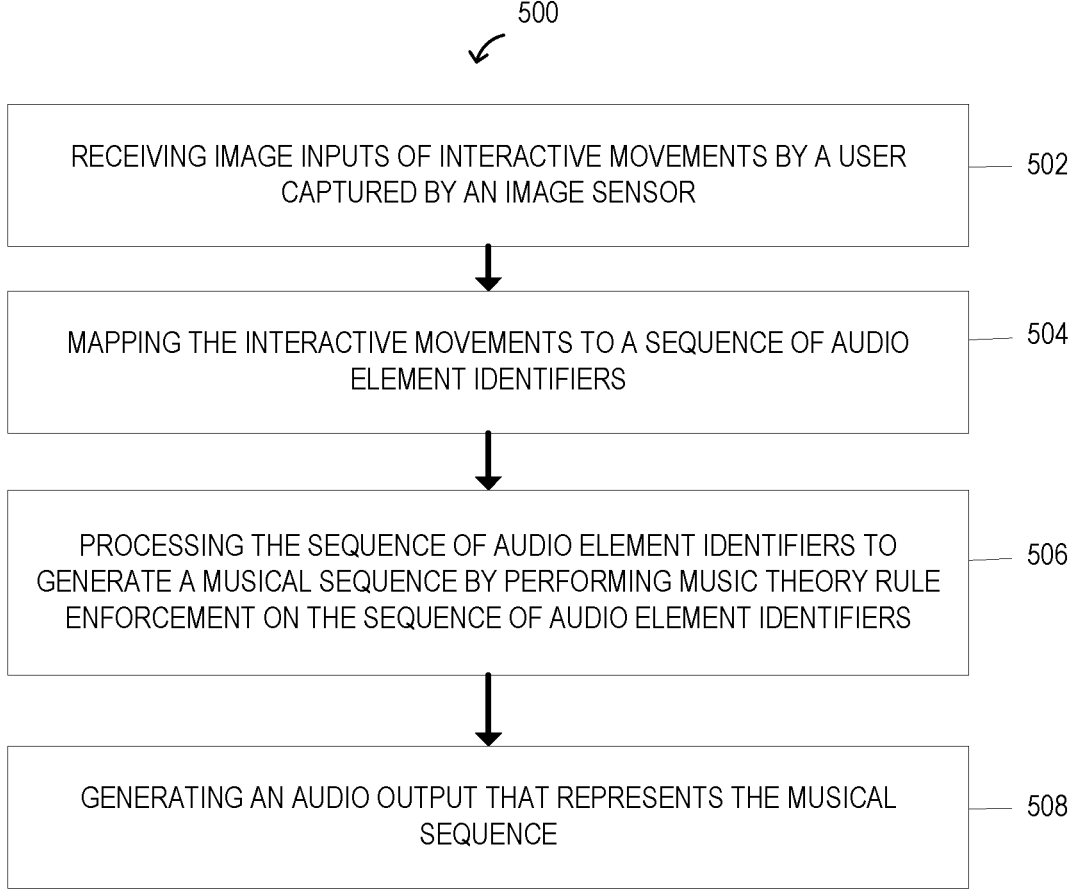

500

RECEIVING IMAGE INPUTS OF INTERACTIVE MOVEMENTS BY A USER CAPTURED BY AN IMAGE SENSOR — 502

MAPPING THE INTERACTIVE MOVEMENTS TO A SEQUENCE OF AUDIO ELEMENT IDENTIFIERS — 504

PROCESSING THE SEQUENCE OF AUDIO ELEMENT IDENTIFIERS TO GENERATE A MUSICAL SEQUENCE BY PERFORMING MUSIC THEORY RULE ENFORCEMENT ON THE SEQUENCE OF AUDIO ELEMENT IDENTIFIERS — 506

GENERATING AN AUDIO OUTPUT THAT REPRESENTS THE MUSICAL SEQUENCE — 508

Fig. 5

INTERACTIVE MOVEMENT AUDIO ENGINE

BACKGROUND

Music composition and sharing of songs or musical sequences are common ways for individuals to socially bond. Some individuals learn to play an instrument such as piano, guitar, percussion, etc. to compose music for themselves and to share with others. However, mastering even a single instrument often takes years of practice and study, while many songs or music sequences may use several different instruments. Making even a short musical sequence that sounds pleasant to other people (i.e., with a high level of musicality) may also require hours of writing out notes, playing separate instruments and recording them in different tracks, then editing the tracks together. Moreover, rules of music theory that promote musicality are nuanced and may be challenging to follow for users that have not studied music.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to generating an audio output.

In one aspect, a method for generating an audio output is provided. Image inputs of interactive movements by a user captured by an image sensor are received. The interactive movements are mapped to a sequence of audio element identifiers. The sequence of audio element identifiers are processed to generate a musical sequence by performing music theory rule enforcement on the sequence of audio element identifiers. An audio output that represents the musical sequence is generated.

In another aspect, a system for generating an audio output is provided. The system includes one or more hardware processors configured by machine-readable instructions to: receive image inputs of interactive movements by a user captured by an image sensor; map the interactive movements to a sequence of audio element identifiers; process the sequence of audio element identifiers to generate a musical sequence by performing music theory rule enforcement on the sequence of audio element identifiers; and generate an audio output that represents the musical sequence.

In yet another aspect, a non-transient computer-readable storage medium is provided. The medium includes instructions being executable by one or more processors, that when executed by the one or more processors, cause the one or more processors to: receive image inputs of interactive movements by a user captured by an image sensor; map the interactive movements to a sequence of audio element identifiers; process the sequence of audio element identifiers to generate a musical sequence by performing music theory rule enforcement on the sequence of audio element identifiers; and generate an audio output that represents the musical sequence.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 4A depicts a diagram of an example sequence of image inputs with facial expressions for generating an audio output in accordance with examples the present disclosure.

FIG. 4B depicts a diagram of example image inputs with facial expression elements for generating an audio output in accordance with examples the present disclosure.

FIG. 5 depicts a flowchart of an example method of generating an audio output in accordance with examples the present disclosure.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As previously discussed, composing and sharing music are common, but composition often takes extensive practice to master both technical skills with an instrument and music theory rules for improved musicality. The present disclosure provides methods and systems for music creation, such as generating an audio output, based on interactive movements of a user, such as moving their hands, feet, arms, and/or legs. In some examples, a user may dance in front of a camera of a computing device (e.g., a mobile phone) to generate an audio output, where the computing device maps the interactive movements of the user to a sequence of audio element identifiers, which are then converted to musical sequence and audio output. In other examples, the user may perform facial expressions (e.g., making a "happy" face) or facial expression elements (e.g., winking, smirking, smiling) as the interactive movements. By using the interactive movements of the user, instead of keystrokes on a piano or fingerings on a guitar, the challenge of technical mastery of an instrument is substantially reduced, improving accessibility to music composition to those without proficiency in a musical instrument. In examples, the computing device includes a music theory engine that generates the musical sequence by performing music theory rule enforcement, for example, by modifying the audio element identifiers to improve their musicality. In this way, the music theory engine substantially reduces the need for proficiency in music theory, further improving accessibility to music composition.

Figure 1:
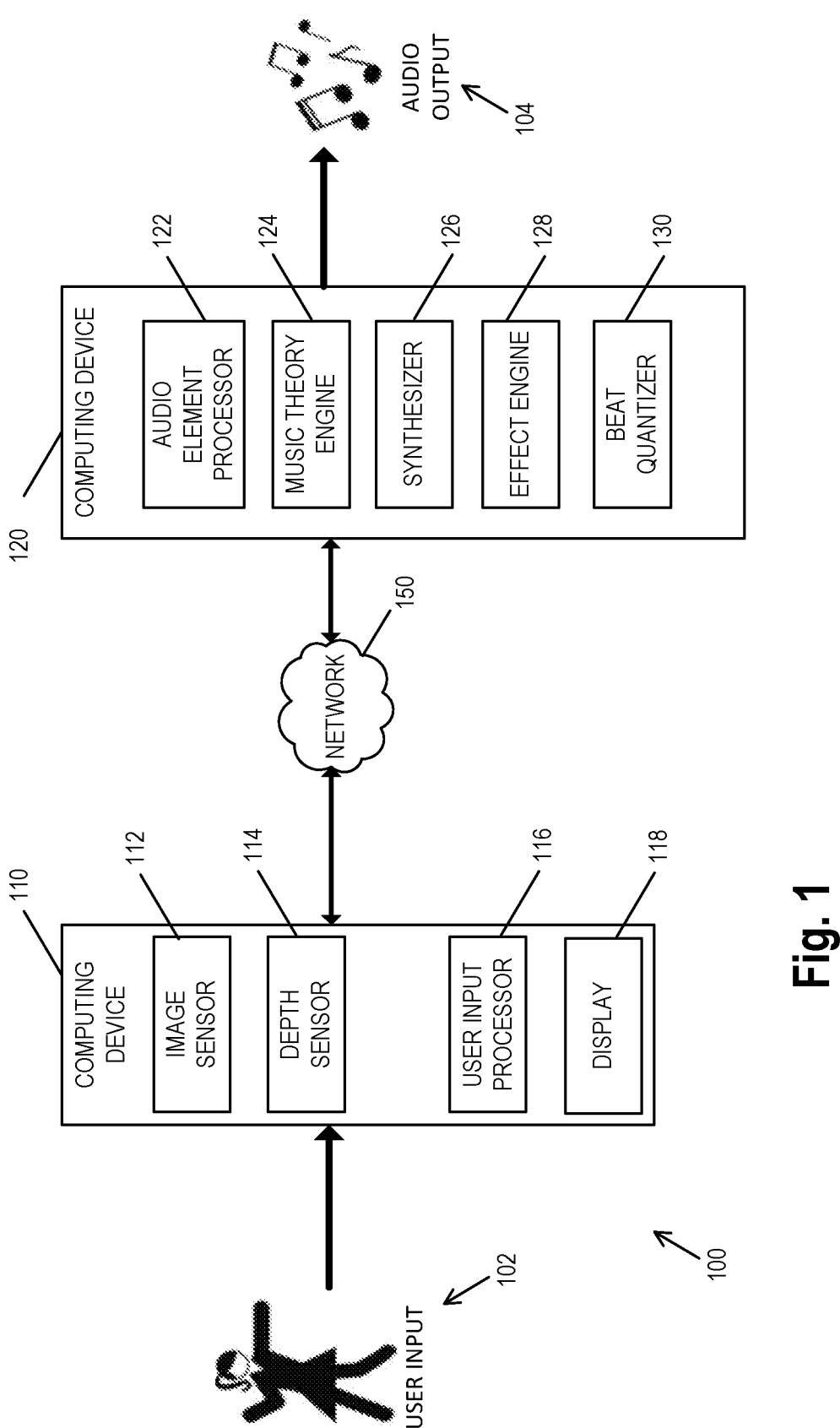
FIG. 1 depicts a block diagram of an example of a system for generating an audio output in accordance with examples the present disclosure.

This and many further embodiments for a computing device are described herein. For instance, FIG. 1 depicts a block diagram of an example of a system 100 that provides an interactive movement audio engine for generating an audio output in accordance with examples the present disclosure. The system 100 includes a computing device 110 and a computing device 120 that are communicatively coupled by a network 150. Computing device 110 may be any type of computing device, including a smartphone, mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). In examples, the computing device 110 is a user device or client device of the user 102, while the computing device 120 is a server device. In some examples, computing device 120 is a network server, cloud server, or other suitable distributed computing system. The computing device 120 may be operated and/or maintained by a social media platform, cloud processing provider, software as a service provider, or other suitable entity. Computing device 110 and/or computing device 120 may be configured to execute one or more software applications (or "applications") and/or services and/or manage hardware resources (e.g., processors, memory, etc.), which may be utilized by users of the computing device 110.

Computing device 110 comprises an image sensor 112, a depth sensor 114, a user input processor 116, and a display 118. The image sensor 112 is configured to capture images and/or video of the user 102, for example, as the user 102 makes interactive movements. The image sensor 112 may be a front-facing "selfie" camera or rear-facing camera of a smartphone, for example. In various examples, images or still frames of a video may be utilized to identify facial expression elements, gestures, and user element movements made by the user 102, as described below. The depth sensor 114 is configured to estimate a distance between the computing device 110 and the user 102, for example, estimating a distance to the hands, arms, feet, and/or head of the user 102. The depth sensor 114 may provide depth information that augments the images captured by the image sensor 112, providing for estimates of a three-dimensional positioning of the user 102.

The user input processor 116 is configured to identify the interactive movements of the user 102 based on the images captured by the image sensor 112 and/or depth information from the depth sensor 114. Moreover, the user input processor 116 determines user input identifiers that correspond to the interactive movements. Advantageously, the user 102 does not need to use the touch screen, a mouse, keyboard, or other physical input device to provide the user input.

Generally, the user input identifiers are discrete identifiers, such as integers or other suitable values, that uniquely identify an interactive movement that has been performed by the user 102. In various examples, the user input processor 116 may include one or more of a gesture processor that identifies gestures made by the user 102, a facial expression processor that identifies facial expressions made by the user 102, and/or a finger position processor that identifies finger positions of the user 102. Further details of the user input processor 116 are provided below with respect to FIG. 2.

The display 118 is configured to show a user interface of the computing device 110. In various examples, the display 118 is a touchscreen display of a smartphone, a monitor for a desktop computer, etc. The display 118 may be configured to display an output image that comprises a graphical user interface overlaid on the image inputs captured by the image sensor 112. The output images may provide real-time feedback to the user 102 of their interactive movements, for example.

The computing device 120 comprises an audio element processor 122, a music theory engine 124, a synthesizer 126, an effect engine 128, and a beat quantizer 130. The audio element processor 122 is configured to map the user input identifiers, which represent the interactive movements of the user, to a sequence of audio element identifiers. The audio element identifiers are data structures that represent musical notes, samples, loops, and/or timbres for musical instruments (e.g., piano, acoustic guitar, trumpet). In some examples, the audio element identifiers are in the Musical Instrument Digital Interface (MIDI) format. For example, the audio element identifiers include information for pitch, velocity, vibrato, panning, clock signals for timing, etc. As an example, an audio element identifier for a Middle C on a piano (approximately 261.63 Hz at fundamental frequency using the A440 pitch standard) may have an integer value for pitch of 60, with a range of values from 0-127 (e.g., two octaves below Middle C has an integer value of 36, the D above Middle C has an integer value of 62). In other examples, different identifiers are used for pitch (e.g., absolute pitch or relative pitch between notes), note duration, volume, etc.

In some examples, the audio element processor 122 maps a single user input identifier to an audio element identifier for a note. In other words, a single interactive movement (e.g., a head nod) is mapped to a single note that includes a start and stop time. In other examples, the audio element processor 122 maps a first user input identifier to an audio element identifier for a start of a note (i.e., a MIDI note-on event), while mapping a second user input identifier to an audio element identifier for a stop of the note (i.e., a MIDI note-off event). In some examples, a same user input identifier is mapped alternately as note-on and note-off events. In other examples, a subsequent, different user input identifier is mapped to both a note-off for a previous note and a note-on for a current note.

Mapping the user input identifiers to the sequence of audio element identifiers may include generating a single audio element identifier for a single user input identifier, or multiple audio element identifiers for a single user input identifier. For example, the user 102 may hold one finger up to an icon on a graphical user interface for a "one-shot" of an audio sample, two fingers for a loop of the audio sample, etc.

In some examples, mapping the interactive movements includes selecting a set of predetermined musical instruments from a plurality of instrument sets, then mapping the interactive movements to instruments within the selected set of predetermined musical instruments. For example, the audio element processor 122 may generate the plurality of instrument sets using a neural network engine that identifies sets of predetermined musical instruments from existing music samples (e.g., from popular, published music). In an example, each set of predetermined musical instruments is selected so that the musical instruments sound pleasant together. Example sets may include: snare drum, kick drum, and high hat for percussion, a bass guitar, and overdriven electric guitar for a blues style set of musical instruments; violin, viola, and cello for a chamber quartet style set of musical instruments; a drum machine, keyboard, and audio samples for a drum and bass style set of musical instruments, etc. The audio element processor 122 may include other sets of instruments for different styles of music, such as country, electronic, hip hop, jazz, Latin, pop, rock, metal, etc. In contrast, a less desirable set of instruments may include a banjo, a slide whistle, a distorted electric guitar, and a drum kit.

The music theory engine 124 is configured to perform music theory rule enforcement on the sequence of audio element identifiers and generate a musical sequence. The musical sequence is also a sequence of audio element identifiers but is more likely to have a high level of musicality. Generally, the music theory engine 124 enforces rules that improve the musicality of the audio output 104 relative to an audio output that is strictly based on the sequence of audio element identifiers. For example, the music theory engine 124 enforces rules to reduce dissonance, change "bad" or "missed" notes to "good" notes (i.e., notes that are not within a current chord are changed to be within the current chord, notes that are not within a current key signature are changed to be within the current key signature), omit missed notes, or insert additional notes. The music theory engine 124 may enforce the rules by modifying at least one audio element identifier of the sequence of audio element identifiers that violates a music theory rule. Example modifications include changing a pitch associated with the at least one audio element identifier (e.g., by matching a chord progression, musical scale, musical mode), omitting the audio element identifier (e.g., erasing a "bad" note), changing a duration of the audio element identifier, or changing other characteristics associated with the audio element identifier.

The music theory engine 124 may include one or more selectable rules that enforce various elements of music theory, such as maintaining consistency with a key signature for notes in a melody, maintaining notes in harmony within a chord, maintaining notes within a chord progression, ensuring that a chord having a dissonant interval is followed by a chord that resolves to a consonant interval, etc.

The synthesizer 126 is configured to convert the musical sequence into an audio output using synthesized or sampled audio and may be implemented by a library of MIDI output routines on the computing device 120, for example, as part of a sound card driver. In other examples, the synthesizer 126 is a keyboard or other suitable MIDI device that converts the musical sequence into an audio output. The audio output may be provided as a WAV file, MP3 file, or other suitable audio output file.

The effect engine 128 is configured to add musical effects to the audio output, such as reverb, chorus, delay, overdrive, distortion, filter cutoff, envelope filter, flange, tremolo, or other suitable effects. In some examples, the effect engine 128 adds a drum backing track, a loop, or other sample sounds to the audio output.

The beat quantizer 130 is configured to change timing aspects (i.e., start and stop times) of individual audio element identifiers of the musical sequence. Generally, the beat quantizer 130 is configured to align individual audio element identifiers to a time signature, a predetermined rhythm pattern, or other suitable timing aspects before the synthesizer 126 generates the audio output. For example, the beat quantizer 130 may align all audio element identifiers of a musical sequence to eighth notes in a 4/4-time signature. In some examples, the beat quantizer 130 randomly or pseudo-randomly selects a predetermined rhythm pattern from a plurality of predetermined rhythm patterns.

In some examples, one or more components of the computing device 110 may be omitted or moved to other devices. In one example, the depth sensor 114 is omitted from the computing device 110. In another example, the user input processor 116 is located at the computing device 120 and omitted from the computing device 110. In this example, the computing device 120 receives the image inputs from the computing device 110. In still another example, the effect engine 128 is omitted from the computing device 120. In another example, the audio element processor 122, the music theory engine 124, the synthesizer 126, the effect engine 128, and the beat quantizer 130 are located at the computing device 110 and omitted from the computing device 120. In this example, the computing device 120 and network 150 may be omitted, with processing to generate an audio output being performed by the computing device 110.

Figure 2:
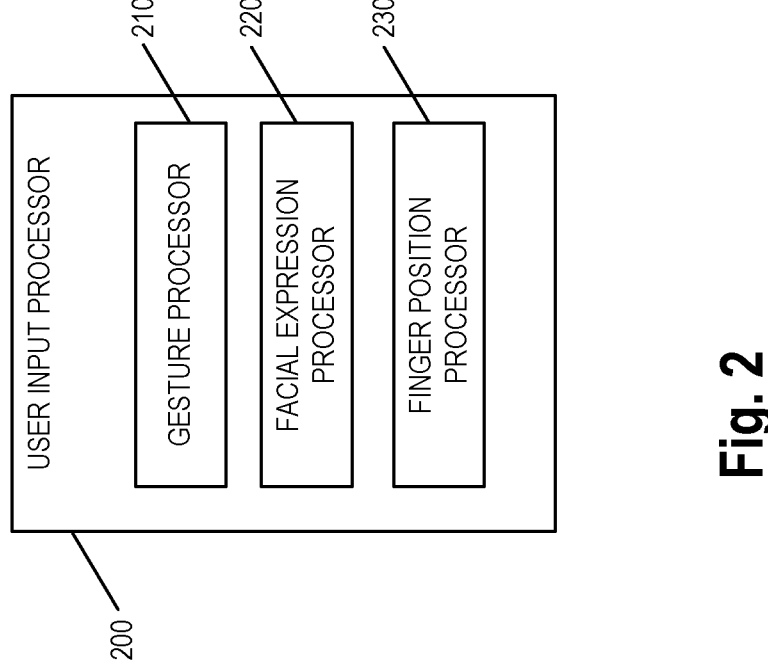
FIG. 2 depicts a block diagram of an example of a user input processor of a computing device in accordance with examples the present disclosure.

FIG. 2 depicts a block diagram of an example of a user input processor 200 of a computing device in accordance with examples of the present disclosure. In some examples, the user input processor 200 generally corresponds to the user input processor 116 and generates user input identifiers as discrete representations of interactive movements from the user 102. The user input processor 200 comprises a gesture processor 210, a facial expression processor 220, and a finger position processor 230.

The gesture processor 210 is configured to identify gestures performed by the user 102 and generate a corresponding user input identifier. Example gestures may include a shrug gesture, a pointing gesture, a head nod, a hand wave, a hand clap, an arm wave, a foot raise, a jump, arms raised to predetermined positions or angles, or other suitable gesture and may be mapped to integer identifiers (e.g., 0 for shrug, 1 for pointing, 2 for head nod, . . . ). Similarly, the facial expression processor 220 is configured to identify facial expressions performed by the user 102 and generate a corresponding user input identifier. Example facial expressions may include a smiling face, a frowning face, a surprised face, an angry face, or other suitable facial expression. In some examples, the user input processor 200 identifies changes in the user 102 over time, such as when a face of the user 102 moves in circle or spins (i.e., when the user 102 turns around). In some examples, the gesture processor 210 identifies only full expressions for a single user input identifier. In other examples, the gesture processor 210 identifies partial expressions, for example, as facial expression elements corresponding to different user input identifiers, such as one eye (or both eyes) being open, one eye (or both eyes) being closed, one eye winking, blinking, an open mouth or closed mouth, smirking with a portion of the mouth, etc.

The finger position processor 230 is configured to identify a current position of one or more fingers of the user 102. When the current position of the fingers overlaps with a portion of a graphical user interface, the finger position processor 230 may provide a user input identifier corresponding to the overlapped portion of the graphical user interface. In other examples, the user input processor 200 also identifies object movement, such as waving drumsticks (or other implements that may mimic drumsticks, such as pencils or pens) that overlap the portion of the graphical user interface. In some examples, the finger position processor 230 maps the finger location to a slider input or pitch wheel and generates a corresponding user interface identifier.

In some examples, the user input processor 200 is configured to recognize interactive movements that mimic use of a musical instrument, such as "air guitar" or "air drums." For an air guitar, the user input processor 200 may identify a hand of the user 102 strumming to select a start and stop of a note and identify another hand fretting notes or chords to select pitch for an imaginary guitar. Additionally, the user input processor 200 may identify an opening amount of a mouth of the user 102 and map the opening amount to an effect, such as a "wah" effect with an open mouth corresponding to a pedal forward position of a wah pedal and a closed mouth corresponding to a pedal back position of the wah pedal. In other examples, the user input processor 200 maps the mouth opening to a different effect that is compatible with an expression pedal, such as volume, reverb, delay level, etc. For air drums, the user input processor 200 may map a lowest point of travel of a drumstick waving motion to a start of a note and a lateral and/or depth position to a pitch (e.g., xylophone key or cymbal pitch) or instrument (e.g., hi-hat or snare drum).

Although the description herein refers to a single user 102, the user input processor 200 may be configured to recognize multiple users simultaneously. In some examples, the audio element processor 122 may assign different users to different instruments within a set of predetermined instruments (e.g., one user on acoustic guitar, one user on piano, one user on percussion).

In some examples, one or two of the processors 210, 220, and/or 230 may be omitted, for example, to simplify operation of the user input processor 200 and/or reduce power consumption for the computing device 110. In other examples, two or more of the processors 210, 220, and/or 230 may be combined with each other, or with other elements of the system 100. In one such example, the processors 210, 220, 230 and the audio element processor 122, the music theory engine 124, the synthesizer 126, the effect engine 128, and the beat quantizer 130 are implemented as a single processor.

Figure 3:
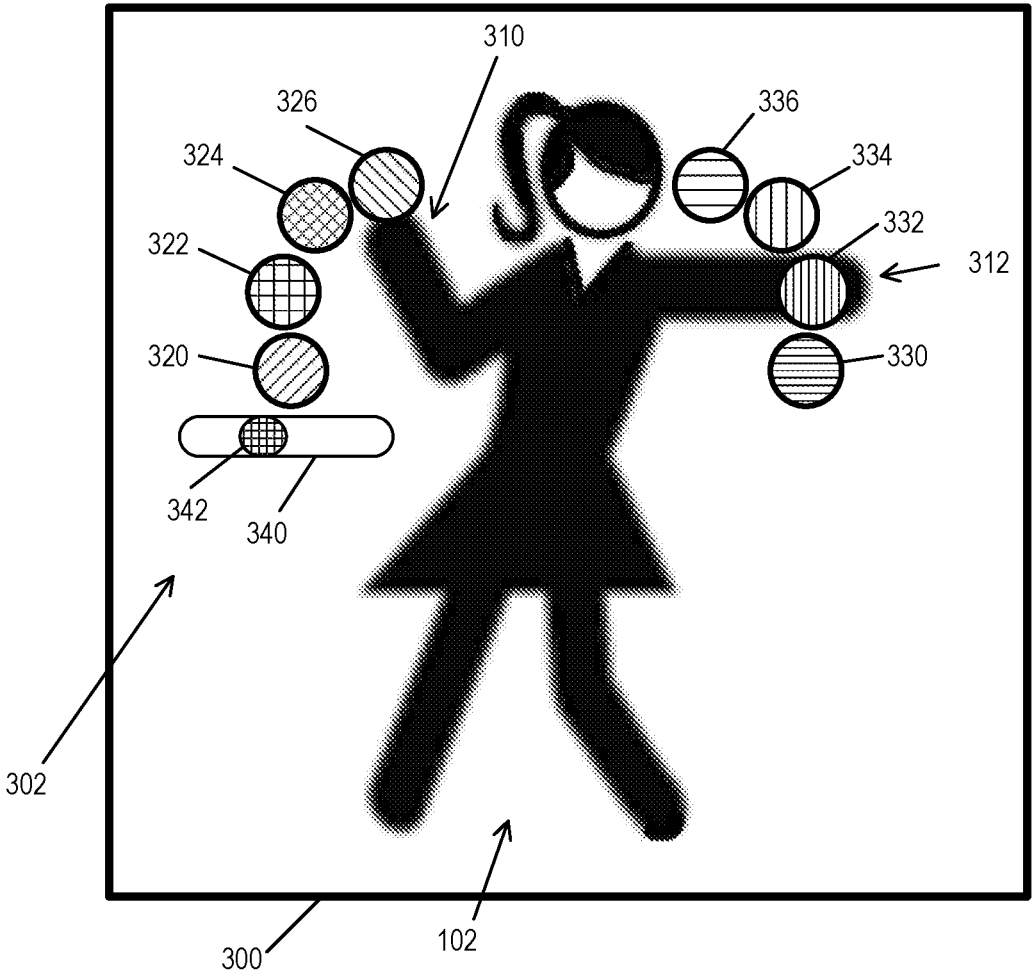
FIG. 3 depicts a diagram of an example output image for a graphical user interface in accordance with examples the present disclosure.

FIG. 3 depicts a diagram of an example output image 300 for a graphical user interface 302 in accordance with examples the present disclosure. In some examples, the computing device 110 displays the output image 300 on the display 118. The output image 300 comprises the graphical user interface 302 overlaid on the image inputs from the image sensor 112 and provides visual feedback to the user 102 for their interactive movements. The graphical user interface 302 comprises a plurality of icons that represent buttons, triggers, switches, sliders, or other user interface elements that the user 102 may interact with virtually. As an example, the user 102 may move various user elements (e.g., fingers, hands, arms, feet, legs, head, or items held in the hand) so that they overlap with the icons of the graphical user interface 302. In the example shown in FIG. 3, the user 102 has a right hand 310 and a left hand 312 with which the user 102 is performing interactive movements.

The graphical user interface 302 includes icons 320, 322, 324, 326, 330, 332, 334, and 336 as buttons, and icons 340 and 342 as elements of a slider. In other examples, icons such as dials, momentary switches, latching switches, or other suitable icons may be implemented in the graphical user interface 302.

In the example shown in FIG. 3, the user 102 is "pressing" the icon 332 with left hand 312. The icons of the graphical user interface 302 may be mapped to respective predetermined audio element identifiers, for example, to different notes of an instrument, pieces of a drum kit, etc. The icons of the graphical user interface 302 may also be mapped to discrete values, such as volume levels, effect levels, frequency levels, etc. For example, the icon 340 may correspond to a volume slider with a range of discrete values from 0 to 100 and a relative location of the icon 342 within the icon 340 may correspond to a discrete value (e.g., a volume level of 40).

FIG. 4A depicts a diagram of an example sequence 400 of image inputs with facial expressions for generating an audio output in accordance with examples the present disclosure. The user input processor 200 may receive the sequence 400, identify various facial expressions or partial facial expressions (e.g., facial expression elements) within the sequence 400 (e.g., using the facial expression processor 220), and map the facial expressions and/or facial expression elements to different audio element identifiers.

In the example of FIG. 4A, the user 102 performs facial expressions including a neutral expression 410 (e.g., neutral eyes, neutral eyebrows, and closed mouth), a smiling expression 412, a neutral expression 414, an excited expression 416, and a neutral expression 418. In one example, the user input processor 200 maps the neutral expressions 410, 414, and 418 to a MIDI all-notes-off identifier or "rest" identifier, maps the smiling expression 412 to an audio element identifier corresponding to a first tuba sound, and maps the excited expression 416 to a second tuba sound. In this example, the beat quantizer 130 may align timing of the various expressions to eighth notes in a 2/4-time signature and the synthesizer 126 may generate an audio output generally corresponding to a polka "oom-pah" rhythm played on off-beats with the tuba.

FIG. 4B depicts a diagram of example image inputs 460 with facial expression elements for generating an audio output in accordance with examples the present disclosure. Facial expression elements 420, 422, and 424 correspond to winking with a left eye, winking with a right eye, and blinking, respectively, by the user 102. Facial expression elements 430, 432, 434, and 436 correspond to an upward right smirk, an upward left smirk, a downward right smirk, and a downward left smirk, respectively. Facial expressions 440, 442, 444, 446, and 448 include various facial expression elements such as raised eyebrows, furled eyebrows, frowns, smiles, and an open mouth. Facial expression elements 450 and 452 correspond to head tilts to the left and to the right, respectively, by the user 102. Although several facial expressions and facial expression elements have been described herein, which may be mapped to different audio element identifiers, the user input processor 200 may be configured to recognize other combinations of facial expression elements, facial expressions, or other inputs, in other examples.

FIG. 5 depicts a flowchart of an example method 500 of generating an audio output in accordance with examples the present disclosure. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the user input processor 116, the display 118), the computing device 120 (e.g., via the music theory engine 124, the synthesizer 126, the effect engine 128, or the beat quantizer 130), or another suitable computing device.

Method 500 begins with step 502. At step 502, image inputs of interactive movements by a user captured by an image sensor are received. In some examples, the image inputs correspond to images such as those shown in FIG. 3, FIG. 4A, and/or FIG. 4B from the user 102 and captured by the image sensor 112. The image inputs may be received by the user input processor 116 or the user input processor 200, for example.

At step 504, the interactive movements are mapped to a sequence of audio element identifiers. In some examples, the audio element processor 122 maps the interactive movements to a sequence of audio element identifiers, as described above. For example, the audio element processor 122 is configured to map the user input identifiers, which represent the interactive movements of the user, to a sequence of audio element identifiers. The audio element identifiers are data structures that represent musical notes, samples, loops, and/or timbres for musical instruments (e.g., piano, acoustic guitar, trumpet). In some examples, the audio element identifiers are in the MIDI format. For example, the audio element identifiers include information for pitch, velocity, vibrato, panning, clock signals for timing, etc.

In some examples, the audio element processor 122 maps a single user input identifier to an audio element identifier for a note. In other words, a single interactive movement (e.g., a head nod) is mapped to a single note that includes a start and stop time. In other examples, the audio element processor 122 maps a first user input identifier to an audio element identifier for a start of a note (i.e., a MIDI note-on event), while mapping a second user input identifier to an audio element identifier for a stop of the note (i.e., a MIDI note-off event). In some examples, a same user input identifier is mapped alternately as note-on and note-off events. In other examples, a subsequent, different user input identifier is mapped to both a note-off for a previous note and a note-on for a current note. In some examples, mapping the interactive movements includes selecting a set of predetermined musical instruments from a plurality of instrument sets, then mapping the interactive movements to instruments within the selected set of predetermined musical instruments.

At step 506, the sequence of audio element identifiers are processed to generate a musical sequence by performing music theory rule enforcement on the sequence of audio element identifiers. In some examples, the music theory engine 124 processes the sequence of audio element identifiers from the audio element processor 122 and generates a musical sequence, as described above. The music theory engine 124 may enforce rules to reduce dissonance, change "bad" or "missed" notes to "good" notes (i.e., notes that are not within a current chord are changed to be within the current chord, notes that are not within a current key signature are changed to be within the current key signature), omit missed notes, or insert additional notes. The music theory engine 124 may enforce the rules by modifying at least one audio element identifier of the sequence of audio element identifiers that violates a music theory rule. Example modifications include changing a pitch associated with the at least one audio element identifier (e.g., by matching a chord progression, musical scale, musical mode), omitting the audio element identifier (e.g., erasing a "bad" note), changing a duration of the audio element identifier, or changing other characteristics associated with the audio element identifier. The music theory engine 124 may include one or more selectable rules that enforce various elements of music theory, such as maintaining consistency with a key signature for notes in a melody, maintaining notes in harmony within a chord, maintaining notes within a chord progression, ensuring that a chord having a dissonant interval is followed by a chord that resolves to a consonant interval, etc.

At step 508, an audio output that represents the musical sequence is generated. In some examples, the synthesizer 126 generates the audio output based on the musical sequence provided by the music theory engine 124. In some examples, generating the musical sequence also includes adding effects to the audio output (e.g., by the effect engine 128) and/or aligning the audio element identifiers to a time signature, rhythm, and/or chord progression (e.g., by the beat quantizer 130).

Figure 6:
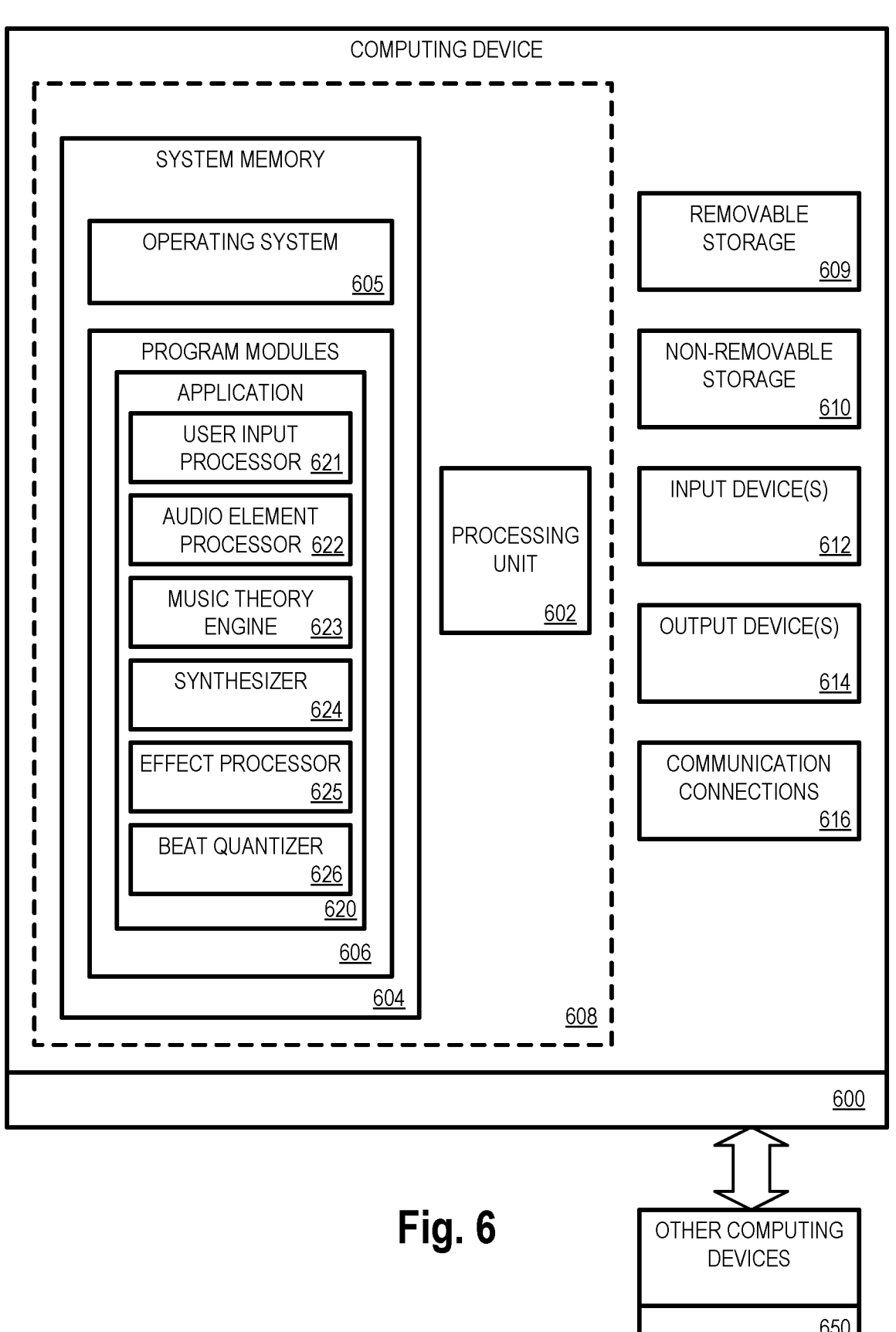
FIG. 6 is a block diagram illustrating example physical components of a computing device with which aspects of the disclosure may be practiced.
Figure 7:
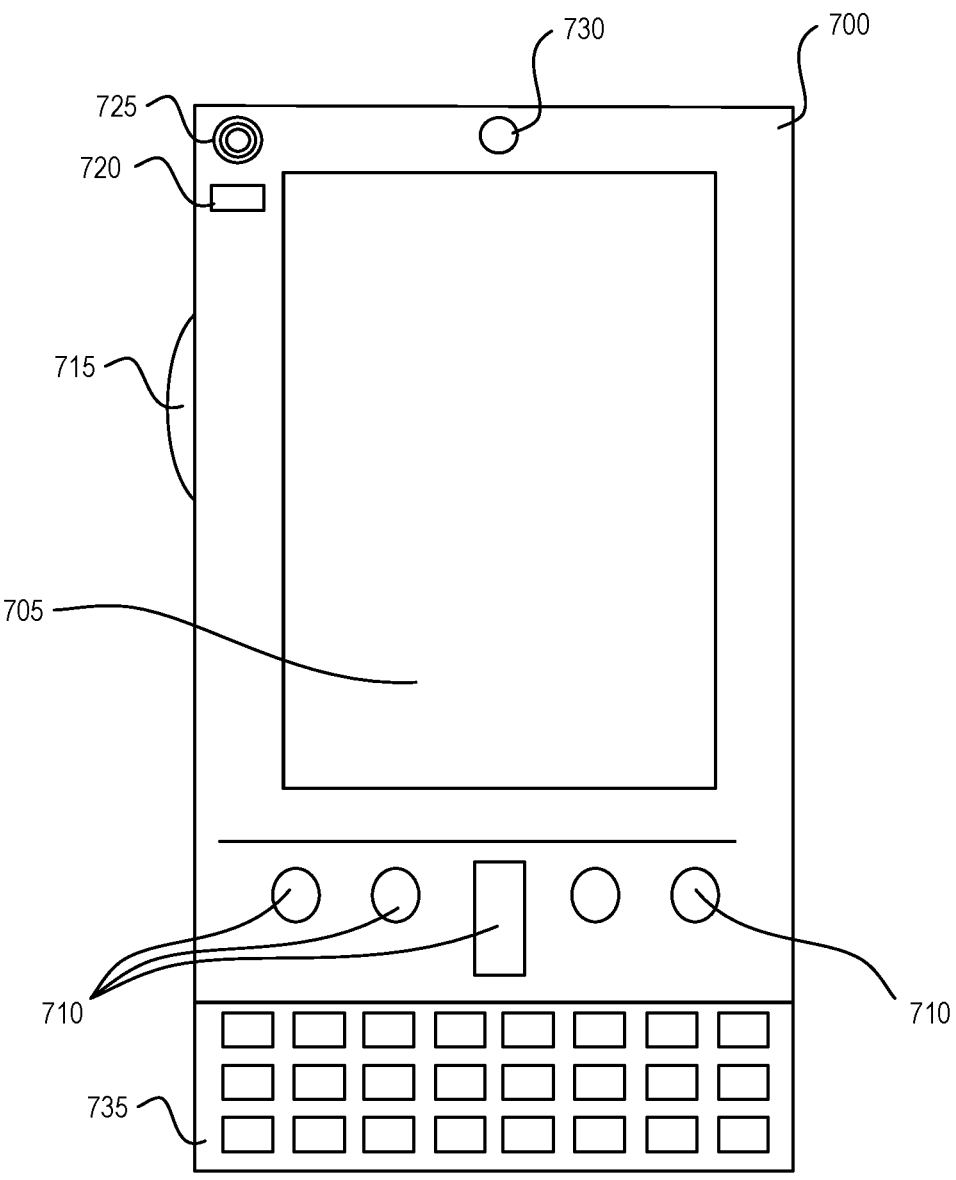
FIGS. 7 and 8 are simplified block diagrams of a mobile computing device with which aspects of the present disclosure may be practiced.
Figure 8:
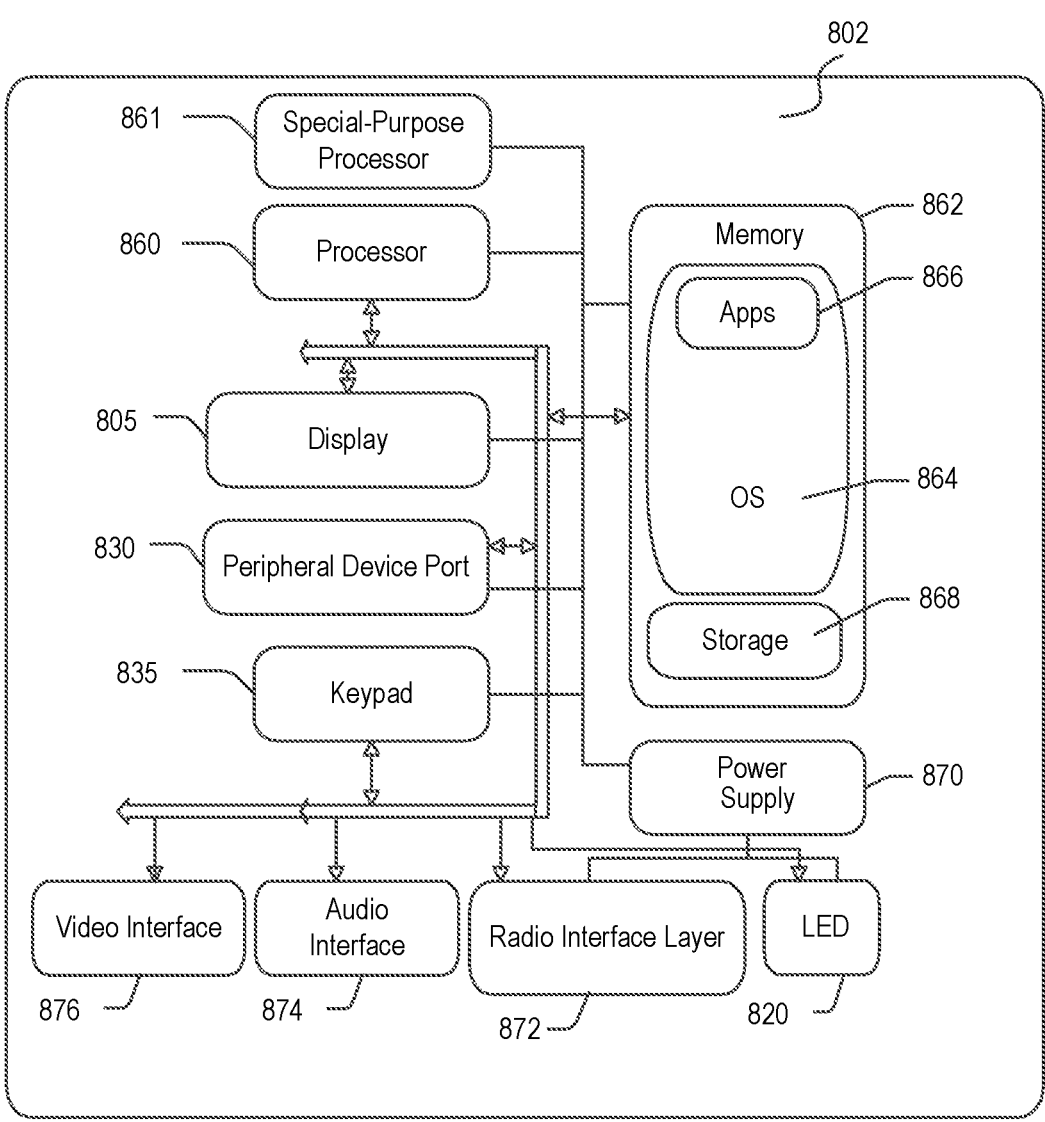

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing an audio output generator application 620 on a computing device (e.g., computing device 110, computing device 120), including computer executable instructions for audio output generator application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running audio output generator application 620, such as one or more components with regard to FIGS. 1 and 2, and, in particular, user input processor 621 (e.g., corresponding to user input processor 116 or user input processor 200), audio element processor 622 (e.g., corresponding to audio element processor 122), music theory engine 623 (e.g., corresponding to music theory engine 124), synthesizer 624 (e.g., corresponding to synthesizer 126), effect processor 625 (e.g., corresponding to effect engine 128), and beat quantizer 626 (e.g., corresponding to beat quantizer 130).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., audio output generator application 620) may perform processes including, but not limited to, the aspects, as described herein. Other program modules that may be used in accordance with aspects of the present disclosure, and in particular for generating an audio output, may include user input processor 621, audio element processor 622, music theory engine 623, synthesizer 624, effect processor 625, and beat quantizer 626.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device

600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may include a front-facing camera 730. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone. The system 802 may include a display 805 (analogous to display 705), such as a touch-screen display or other suitable user interface. The system 802 may also include an optional keypad 835 (analogous to keypad 735) and one or more peripheral device ports 830, such as input and/or output ports for audio, video, control signals, or other suitable signals.

The system 802 may include a processor 860 coupled to memory 862, in some examples. The system 802 may also include a special-purpose processor 861, such as a neural network processor. One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated embodiment, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for generating an audio output according to at least the examples provided in the sections below:

(A1) In one aspect, some examples include a method for generating an audio output. The method includes receiving image inputs of interactive movements by a user captured by an image sensor, mapping the interactive movements to a sequence of audio element identifiers, processing the sequence of audio element identifiers to generate a musical sequence by performing music theory rule enforcement on the sequence of audio element identifiers, and generating an audio output that represents the musical sequence.

(A2) In some examples of A1, processing the audio element identifiers comprises: modifying at least one audio element identifier of the sequence of audio element identifiers that violates a music theory rule; and generating the musical sequence based on the modified audio element identifier.

(A3) In some examples of A1-A2, modifying the at least one audio element identifier comprises changing a pitch associated with the audio element identifier.

(A4) In some examples of A1-A3, changing the pitch comprises matching a chord progression that satisfies the music theory rule.

(A5) In some examples of A1-A4, modifying the at least one audio element identifier comprises omitting the at least one audio element identifier when generating the musical sequence.

(A6) In some examples of A1-A5, modifying the at least one audio element identifier comprises changing a duration of the at least one audio element identifier.

(A7) In some examples of A1-A6, mapping the interactive movements comprises: selecting a set of predetermined musical instruments from a plurality of instrument sets; mapping the interactive movements to instruments within the selected set of predetermined musical instruments.

(A8) In some examples of A1-A7, the method further comprising generating the plurality of instrument sets using a neural network engine that identifies sets of predetermined musical instruments from music samples.

(A9) In some examples of A1-A8, the method further comprising displaying to the user an output image that comprises a graphical user interface overlaid on the image inputs, wherein the interactive movements comprise user elements of the user that overlap with the graphical user interface.

(A10) In some examples of A1-A9, the user elements of the user are fingers, hands, arms, feet, and/or legs of the user.

(A11) In some examples of A1-A10, the graphical user interface includes a plurality of icons corresponding to a plurality of predetermined audio element identifiers; and mapping the interactive movements comprises mapping an interactive movement with a user element that overlaps an icon to a predetermined audio element identifier corresponding to the overlapped icon.

(A12) In some examples of A1-A11, the plurality of predetermined audio element identifiers includes single-element identifiers and multi-element identifiers.

(A13) In some examples of A1-A12, the interactive movements are facial expression elements performed by the user.

(A14) In some examples of A1-A13, the interactive movements are gestures performed by the user.

In yet another aspect, some examples include a computing system including one or more processors and memory coupled to the one or more processors, the memory storing one or more instructions which when executed by the one or more processors, causes the one or more processors perform any of the methods described herein (e.g., A1-A14 described above).

In yet another aspect, some examples include a non-transitory computer-readable storage medium storing one or more programs for execution by one or more processors of a storage device, the one or more programs including instructions for performing any of the methods described herein (e.g., A1-A14 described above).

In yet another aspect, some examples include a computing system including one or more processors and memory coupled to the one or more processors, the memory storing one or more instructions which when executed by the one or more processors, causes the one or more processors perform any of the methods described herein (e.g., method 500 described above).

In yet another aspect, some examples include a non-transitory computer-readable storage medium storing one or more programs for execution by one or more processors of a storage device, the one or more programs including instructions for performing any of the methods described herein (e.g., method 500 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating an audio output, the method comprising:

receiving image inputs of interactive movements by a user captured by an image sensor;

displaying to the user an output image that comprises a graphical user interface overlaid on the image inputs, wherein the interactive movements comprise a plurality of user elements of the user that overlap with a corresponding plurality of icons the graphical user interface;

mapping each of the plurality of user elements of the interactive movements so that the user element overlaps with the corresponding icon of the plurality of icons of the graphical user interface to a sequence of audio element identifiers;

processing the sequence of audio element identifiers to generate a musical sequence by performing music theory rule enforcement on the sequence of audio element identifiers, wherein processing the audio element identifiers comprises:

receiving one or more selectable music theory rules that enforce corresponding elements of music theory;

modifying at least one audio element identifier of the sequence of audio element identifiers that violates a music theory rule when the violated music theory rule is at least one of the one or more received selectable music theory rules; and generating the musical sequence based on the modified audio element identifier; and generating an audio output that represents the musical sequence.

2. The method of claim 1, wherein modifying the at least one audio element identifier comprises changing a pitch associated with the audio element identifier.

3. The method of claim 2, wherein changing the pitch comprises matching a chord progression that satisfies the music theory rule.

4. The method of claim 1, wherein modifying the at least one audio element identifier comprises omitting the at least one audio element identifier when generating the musical sequence.

5. The method of claim 1, wherein modifying the at least one audio element identifier comprises changing a duration of the at least one audio element identifier.

6. The method of claim 1, wherein mapping the interactive movements comprises:

selecting a set of predetermined musical instruments from a plurality of instrument sets;

mapping the interactive movements to instruments within the selected set of predetermined musical instruments.

7. The method of claim 6, the method further comprising generating the plurality of instrument sets using a neural network engine that identifies sets of predetermined musical instruments from music samples.

8. The method of claim 1, wherein the plurality of user elements of the user are fingers, hands, arms, feet, and/or legs of the user.

9. The method of claim 1, wherein the plurality of icons corresponding to a plurality of predetermined audio element identifiers.

10. The method of claim 9, wherein the plurality of predetermined audio element identifiers includes single-element identifiers and multi-element identifiers.

11. The method of claim 1, wherein the interactive movements are facial expression elements performed by the user.

12. The method of claim 1, wherein the interactive movements are gestures performed by the user.

13. A system for generating an audio output, the system comprising:

one or more hardware processors configured by machine-readable instructions to:

receive image inputs of interactive movements by a user captured by an image sensor;

display to the user an output image that comprises a graphical user interface overlaid on the image inputs, wherein the interactive movements comprise a plurality of user elements of the user that overlap with a corresponding plurality of icons the graphical user interface;

map each of the plurality of user elements of the interactive movements so that the user element overlaps with the corresponding icon of the plurality of icons of the graphical user interface to a sequence of audio element identifiers;

process the sequence of audio element identifiers to generate a musical sequence by performing music theory rule enforcement on the sequence of audio element identifiers, wherein processing the audio element identifiers comprises:

receive one or more selectable music theory rules that enforce corresponding elements of music theory;

modify at least one audio element identifier of the sequence of audio element identifiers that violates a music theory rule when the violated music theory rule is at least one of the one or more received selectable music theory rules; and generate the musical sequence based on the modified audio element identifier; and generate an audio output that represents the musical sequence.

14. The system of claim 13, wherein the one or more hardware processors are further configured by machine-readable instructions to:

change a pitch associated with the audio element identifier.

15. The system of claim 13, wherein the plurality of icons corresponding to a plurality of predetermined audio element identifiers.

16. The system of claim 13, wherein modifying the at least one audio element identifier comprises changing a pitch associated with the audio element identifier.

17. The system of claim 16, wherein changing the pitch comprises matching a chord progression that satisfies the music theory rule.

18. The system of claim 13, wherein modifying the at least one audio element identifier comprises omitting the at least one audio element identifier when generating the musical sequence.

19. A non-transient computer-readable storage medium comprising instructions being executable by one or more processors, that when executed by the one or more processors, cause the one or more processors to:

receive image inputs of interactive movements by a user captured by an image sensor;

display to the user an output image that comprises a graphical user interface overlaid on the image inputs, wherein the interactive movements comprise a plurality of user elements of the user that overlap with a corresponding plurality of icons the graphical user interface;

map each of the plurality of user elements of the interactive movements so that the user element overlaps with the corresponding icon of the plurality of icons of the graphical user interface to a sequence of audio element identifiers;

process the sequence of audio element identifiers to generate a musical sequence by performing music theory rule enforcement on the sequence of audio element identifiers, wherein processing the audio element identifiers comprises:

receive one or more selectable music theory rules that enforce corresponding elements of music theory;

modify at least one audio element identifier of the sequence of audio element identifiers that violates a music theory rule when the violated music theory rule is at least one of the one or more received selectable music theory rules; and generate the musical sequence based on the modified audio element identifier; and generate an audio output that represents the musical sequence.

20. The computer-readable storage medium of claim 19, wherein the instructions are executable by the one or more processors to cause the one or more processors to: change a pitch associated with the audio element identifier.

* * * * *